(12) United States Patent
Hsu (10) Patent No.: US 8,052,183 B2
(45) Date of Patent: Nov. 8, 2011

(54) BUMPER STRUCTURE FOR AN AUTOMATIC MOVING DEVICE

(75) Inventor: Wei Hsu, Chung Ho (TW)

(73) Assignee: Weistech Technology Co., Ltd., Taipei County (TW)

( * ) Notice: Subject to any disclaimer, the term of this patent is extended or adjusted under 35 U.S.C. 154(b) by 114 days.

(21) Appl. No.: 12/715,524

(22) Filed: Mar. 2, 2010

(65) Prior Publication Data

US 2010/0235000 A1 Sep. 16, 2010

(30) Foreign Application Priority Data

Mar. 10, 2009 (CN) .......................... 2009 1 0126509

(51) Int. Cl.
*B60R 99/00* (2009.01)
(52) U.S. Cl. ........................................... 293/4; 700/275
(58) Field of Classification Search .................. 293/1, 4; 700/275; 901/1, 46
See application file for complete search history.

(56) References Cited

U.S. PATENT DOCUMENTS

| | | | |
|---|---|---|---|
| 4,967,862 A * | 11/1990 | Pong et al. ........................ | 293/4 |
| 5,389,757 A * | 2/1995 | Souliere ....................... | 200/345 |
| 6,286,895 B1 * | 9/2001 | Urushiyama et al. ..... | 296/187.03 |
| 6,443,509 B1 * | 9/2002 | Levin et al. ....................... | 293/4 |
| 7,208,548 B2 * | 4/2007 | Hakuta et al. ................. | 525/105 |
| 2007/0100500 A1 * | 5/2007 | Abramson et al. ............ | 700/245 |
| 2008/0155768 A1 * | 7/2008 | Ziegler et al. ................ | 700/245 |
| 2009/0167300 A1 * | 7/2009 | Cech et al. .................... | 324/239 |

* cited by examiner

*Primary Examiner* — Lori Lyjak
(74) *Attorney, Agent, or Firm* — Ming Chow; Sinorica, LLC (57) ABSTRACT

The present invention provides a bumper structure for an automatic moving device which directs the moving device to change directions when bumping into an obstacle. The bumper structure of the present invention comprises a base, an elastic housing and a conductive terminal. A plurality of conductive sheets is formed over the base, wherein the conductive sheets are coupled to the control circuit of a moving device via the base. The elastic housing is formed over the base, with a protruding actuator section formed within the elastic housing, and the actuator section is parallel to the conductive sheets. The conductive terminal is formed at the bottom of the actuator section but is not in contact with the conductive sheets. The elastic housing may provide buffer when bumping into an obstacle, and the force generated by the impact presses the actuator section downwards, allowing conductive terminal of the actuator section to couple with the plurality of conductive sheets, thereby connects the plurality of conductive sheets and sends a signal to the control circuit of the moving device, directing the moving device to change directions.

20 Claims, 11 Drawing Sheets

BUMPER STRUCTURE FOR AN AUTOMATIC MOVING DEVICE

TECHNICAL FIELD

The present invention relates to bumper structures, especially to a bumper structure which directs a moving device to change directions when bumping into an obstacle.

BACKGROUND

With the continuous development and improvement in technology, scenes in the movies where robots serving humans and the coexistence of humans and robots is now a dream that may be realized. In recent years, intelligent robotic systems have been widely used in factory automations, hospital automations, museum tour guides, surgical auxiliary systems, space explorations, military applications, domestic services, office services, entertainment purposes and even performed dangerous mission for humans.

As robots are now viewed as the emerging industry for next generation, many organizations have invested a large amount of resources into the research and development of robots, which allowed robots for various purposes to be present to the public continually, such as the robotic pets for accompanying humans and the cleaning robots for cleaning up the house. However, regardless of the structurally complex industrial robots or the relatively simple structured household small robots all require the equipping of sensing elements, for the convenience of robotic activities and prevent robots from bumping into obstacles and become damaged.

High cost and structurally complex robots usually utilize different types of sensors simultaneously for accurate obstacle detection and avoid impacts. For example, the ASIMO robot developed by Honda utilizes visual sensors mounted on the head and ground surface sensors to perform obstacle detection, map out another route to go around the obstacles and arrive at the destination. Moreover, there are also many domestic robots on the market that are affordable to general families, such as the Trilobite vacuum robot manufactured by Electrolux. The Trilobite utilizes ultrasonic sensors to spot and avoid obstacles via sending and receiving ultrasonic signals. However, although visual sensors, ultrasonic sensors and infrared sensors may be effective at spotting and avoiding obstacles, but the disadvantages include the high cost of production and being structurally complicated, also, when the robot moves too fast and the sensors cannot react in time and impacts with the obstacle, the sensors are unable to provide buffer.

Other methods for robots to effectively detect and avoid obstacles include the use of infrared signals or safety magnetic strips for the construction of virtual walls, even though these methods may limit the robots' movements to avoid obstacles, but they are ineffective when it comes to avoiding moving obstacles (such as cats, dogs and humans etc.), and the methods of use are rather inconvenient.

Even though the domestic robots (such as Roomba the vacuum robot and Scooba the ground washing robot developed by iRobot,) sold on the current market usually contain bumpers to lower the damages from impacts, but the bumpers are usually only configured at the front of the robots, therefore when the robot turns around or backs up and impacts with the obstacle with its sides or the back would limit the bumper from providing buffer protection. Moreover, as the bumpers are usually coupled to touch sensors, so if the robot section that contacts with the obstacle is without bumpers, then the sensors would not be activated, thus would require other sensing devices to react to the impact.

Conductive rubber particles and conductive rubber strips are a popular material for electrical wiring, as they have the advantages of being fine, light weight, adaptable, reliable and flexible, and may be securely fixed on to components without soldering to turn on electronic components, and therefore widely used in remote controls, mobile phones, notebooks, portable music players and other electronic products.

Due to the above, the present invention provides a bumper structure for a moving device (such as a robot) to change directions when bumping into an obstacle, with the effects of providing buffer during impacts, can be implemented with low cost and may be wrapped around the moving device to provide a 360° buffer protection.

SUMMARY OF THE INVENTION

An object of the present invention is to provide a bumper structure that allows a moving device to change directions when bumping into an obstacle, with the advantages of low cost of production and being simple structured.

Another object of the present invention is to provide a bumper structure that allows a moving device to change directions when bumping into an obstacle, it provides buffer when the moving device bumps into the obstacle and minimizes the damage.

Yet another object of the present invention is to provide a bumper structure that allows a moving device to change directions when bumping into an obstacle, it may be wrapped around the moving device to provide a 360° buffer protection.

According to one perspective of the present invention, the invention provides a bumper structure for moving devices, which directs moving devices to change directions when bumping into an obstacle. The bumper structure comprises a base, an elastic housing and a conductive terminal. A plurality of conductive sheets is formed over the base, wherein the conductive sheets are coupled to the control circuit of a moving device via the base. The elastic housing is formed over the base, with a protruding actuator section formed within the elastic housing, and the actuator section is parallel to the conductive sheets. The conductive terminal is formed at the bottom of the actuator section but is not in contact with the conductive sheets. The elastic housing may provide buffer when bumping into an obstacle, and the force generated by the impact presses the actuator section downwards, allowing conductive terminal of the actuator section to couple with the plurality of conductive sheets, thereby connects the plurality of conductive sheets and sends a signal to the control circuit of the moving device, directing the moving device to change directions.

According to another perspective of the present invention, the invention provides a bumper structure for moving devices, which directs moving devices to change directions when bumping into an obstacle. The bumper structure comprises a base, a plurality of actuator sections and a plurality of elastic housings. A plurality of conductive sheets is formed over the base, wherein the conductive sheets are coupled to the control circuit of a moving device via the base. The plurality of actuator sections is formed over the base, with a plurality of conductive terminals formed at the bottom of the actuator sections, respectively, wherein the plurality of actuator sections is parallel to the plurality of conductive sheets, and the plurality of conductive terminals is not in contact with the plurality of conductive sheets. The plurality of elastic housings is formed over the plurality of actuator sections. The elastic housings may provide buffer when bumping into an obstacle, and the force generated by the impact presses the respective actuator section downwards, allowing conductive terminal of the respective actuator section to couple with the plurality of conductive sheets, thereby connects the plurality of conductive sheets and sends a signal to the control circuit of the moving device, directing the moving device to change directions.

BRIEF DESCRIPTION OF THE DRAWINGS

The present invention may be understood by the detailed descriptions of the preferred embodiments outlined in the specification and the drawings attached. However, it should be appreciated by those skilled in the art, that the preferred embodiments are provided for illustration rather than limiting the present invention, wherein.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
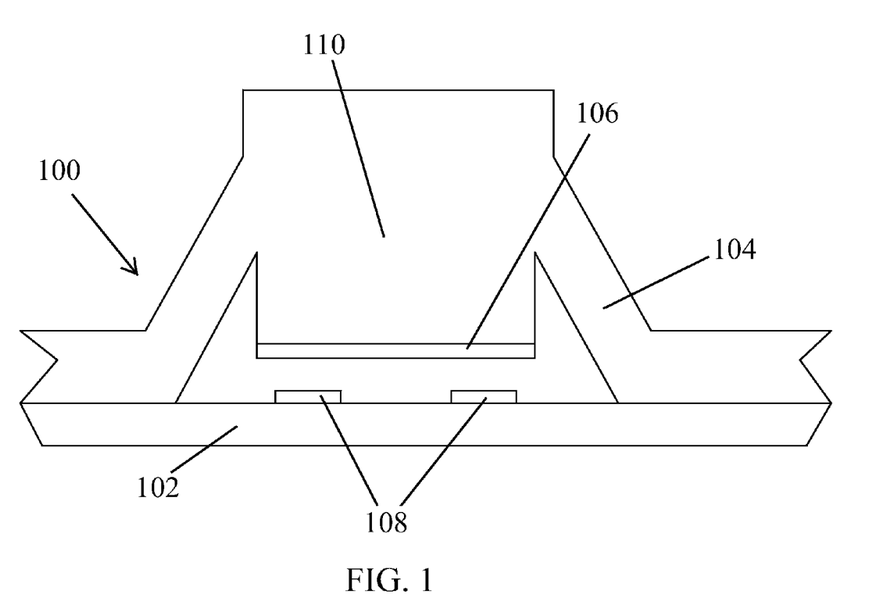
FIG. 1 illustrates the cross section diagram of a bumper structure before impact, according to a preferred embodiment of the present invention.

Refer to FIG. 1, it illustrates the cross section diagram for the preferred embodiment of a bumper structure before impact, according to the present invention. Bumper structure 100 comprises a base 102, an elastic housing 104 and a conductive terminal 106. As shown, a plurality of conductive sheets 108 is formed over base 102; elastic housing 104 is formed over base 102, with a protruding actuator section 110 formed within elastic housing 104, and actuator section 110 is parallel to conductive sheets 108; conductive terminal 106 is formed at the bottom of actuator section 110 but is not in contact with conductive sheets 108. Moreover, conductive sheets 108 are coupled to the control circuit of a moving device (not shown) via base 102.

Figure 2:
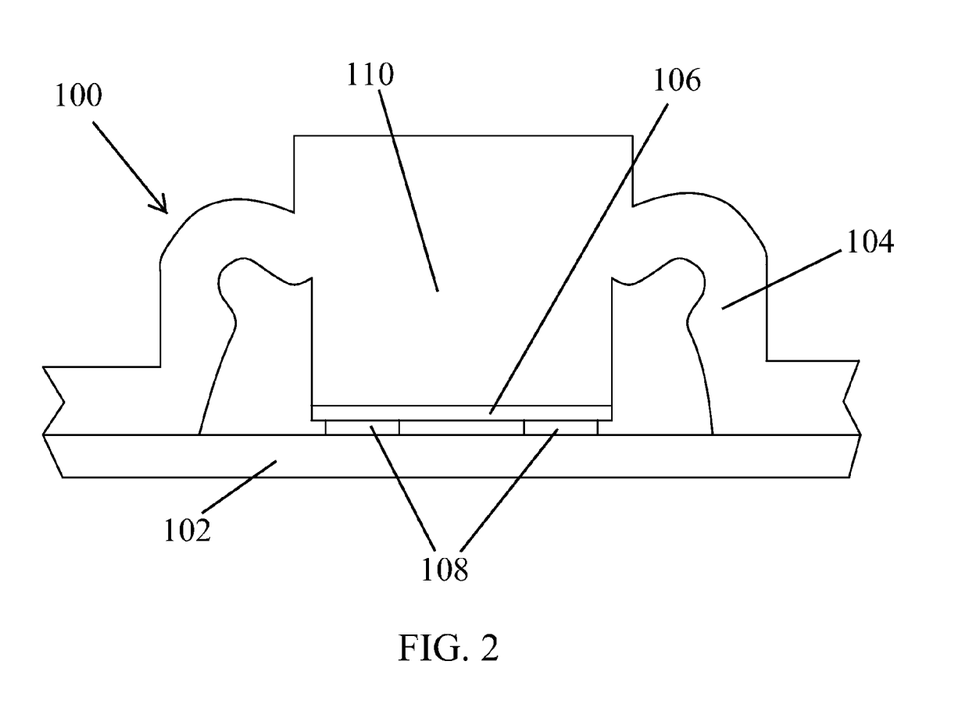
FIG. 2 illustrates the cross section diagram of a bumper structure during impact, according to a preferred embodiment of the present invention.

FIG. 2 illustrates the cross section diagram for the preferred embodiment of a bumper structure during impact, according to the present invention. Elastic housing 104 may provide buffer when impact occurs, allowing damages done to bumper structure 100 (and connected device) to be minimized. In addition, the force generated by the impact presses actuator section 110 downwards, allowing conductive terminal 106 of actuator section 110 to couple with the plurality of conductive sheets 108. Thus, the plurality of conductive sheets 108 will be connected and sends a signal to the control circuit of the moving device (not shown), directing the moving device to change directions.

In some embodiments, a flexible base (e.g. silicone rubber or rubber) may be used as the base for the bumper structure, in coordination with an elastic housing would allow the bumper structure to encircle or cover the moving device (e.g. robots, small vehicles or self-moving toys) as required. Moreover, different shapes of elastic housing may be utilized according to the exterior designs of the moving device, such as strip-like, granular, columnar, sheet-like, polygonal or irregular shaped etc.

In some embodiments, conductive pads or printed circuits may replace the conductive sheets on the base. In some embodiments, the conductive terminal on the actuator section may be conductive rubber, low resistance copper or carbon diaphragm.

Figure 3:
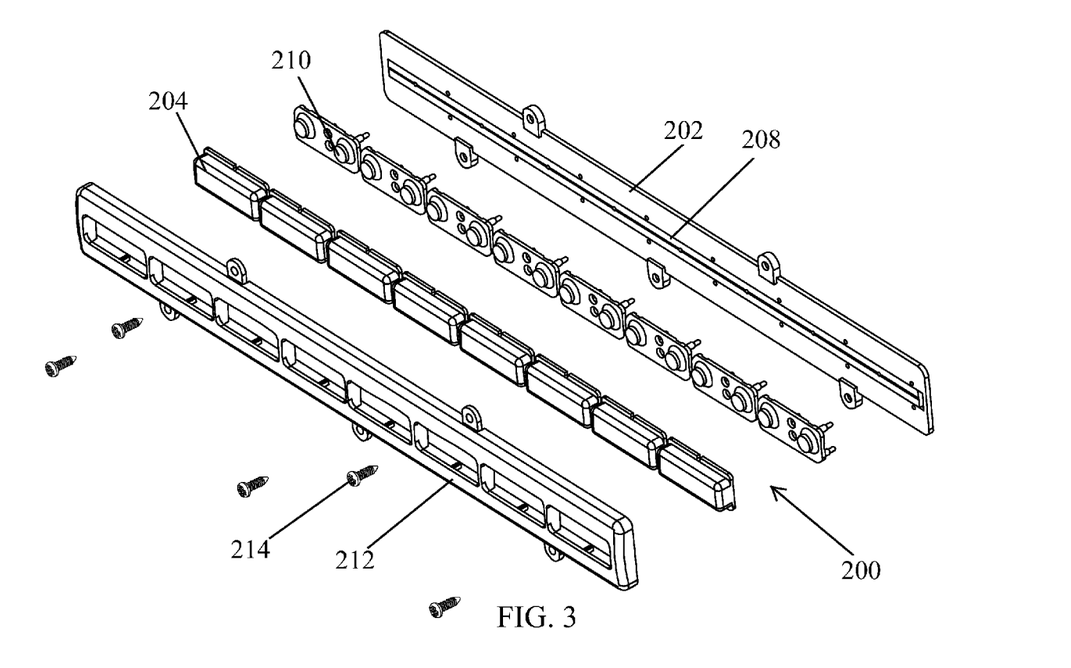
FIG. 3 illustrates the decomposition diagram of a bumper structure according to another preferred embodiment of the present invention.
Figure 4:
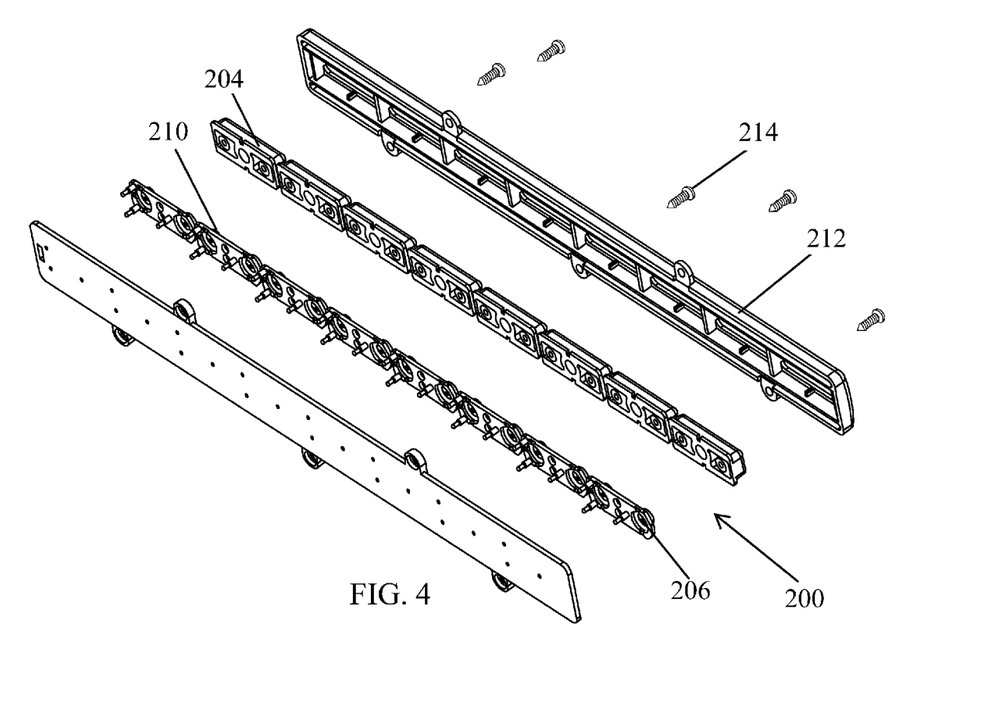
FIG. 4 is another decomposition diagram of the bumper structure in FIG. 3, viewed from another angle.
Figure 5:
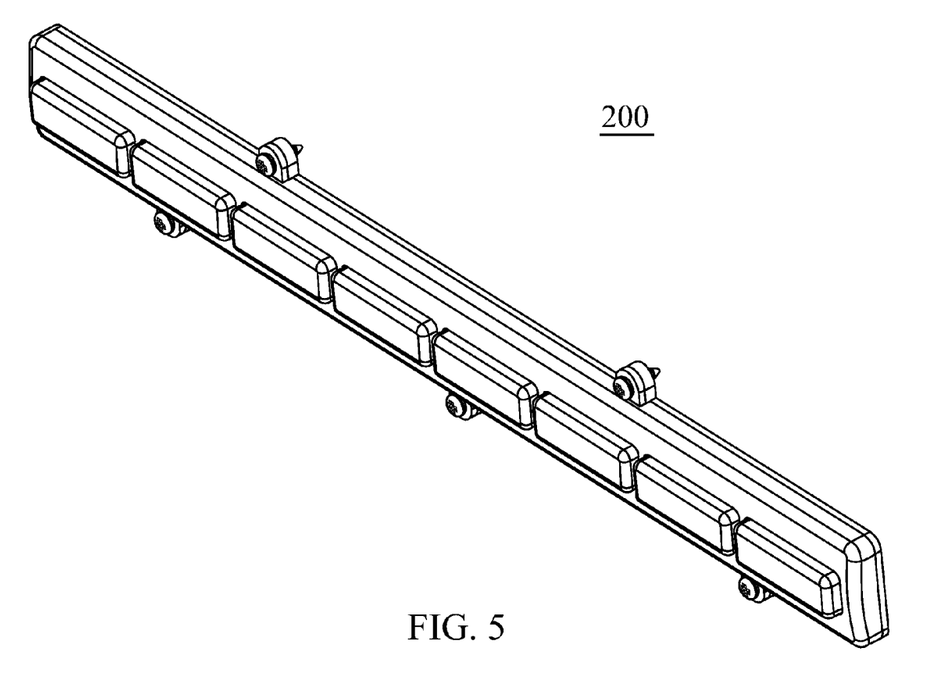
FIG. 5 illustrates the assembled bumper structure according to FIG. 3 and FIG. 4.

In some embodiments, a plurality of bumper structures may be connected together via array arrangements, forming a bumper block or a bumper strip. Refer to FIG. 3, FIG. 4 and FIG. 5, These figures illustrate another preferred embodiment of a bumper structure disclosed by the present invention. Bumper structure 200 comprises a base 202, a plurality of elastic housings 204, a plurality of actuator sections 210, upper lid 212 and a plurality of fixing elements 214. As shown, a plurality of conductive sheets 208 is formed over base 202; the plurality of actuator section 210 is arranged in arrays and configured on base 202, with corresponding conductive terminals 206 located at the bottom of actuator section 210, wherein actuator sections 210 are parallel to conductive sheets 208, and conductive terminals 206 are not in contact with conductive sheets 208; elastic housings 204 are covered over respective actuator sections 210; upper lid 212 covers over elastic housings 204, and upper lid 212, the plurality of elastic housings 204 and the plurality of actuator sections 210 are fixed on base 202 (as shown in FIG. 5) through the plurality of fixing elements 214. Also, conductive sheets 208 are coupled to the control circuit of a moving device (not shown) via base 202. Conductive sheets 208 become connected when pressured and send control signal to the control circuit of the moving device for command implementation.

When impact occurs, elastic housings 204 may provide buffer, allowing damages done to bumper structure 200 (and connected device) to be minimized. In addition, the force generated by the impact presses corresponding actuator section 210 downwards, allowing conductive terminals 206 on corresponding actuator section 210 to couple with the plurality of conductive sheets 208. Thus, the plurality of conductive sheets 208 will be connected and sends signal to the control circuit of the moving device (not shown), directing the moving device to change directions.

Figures 6, 6A:
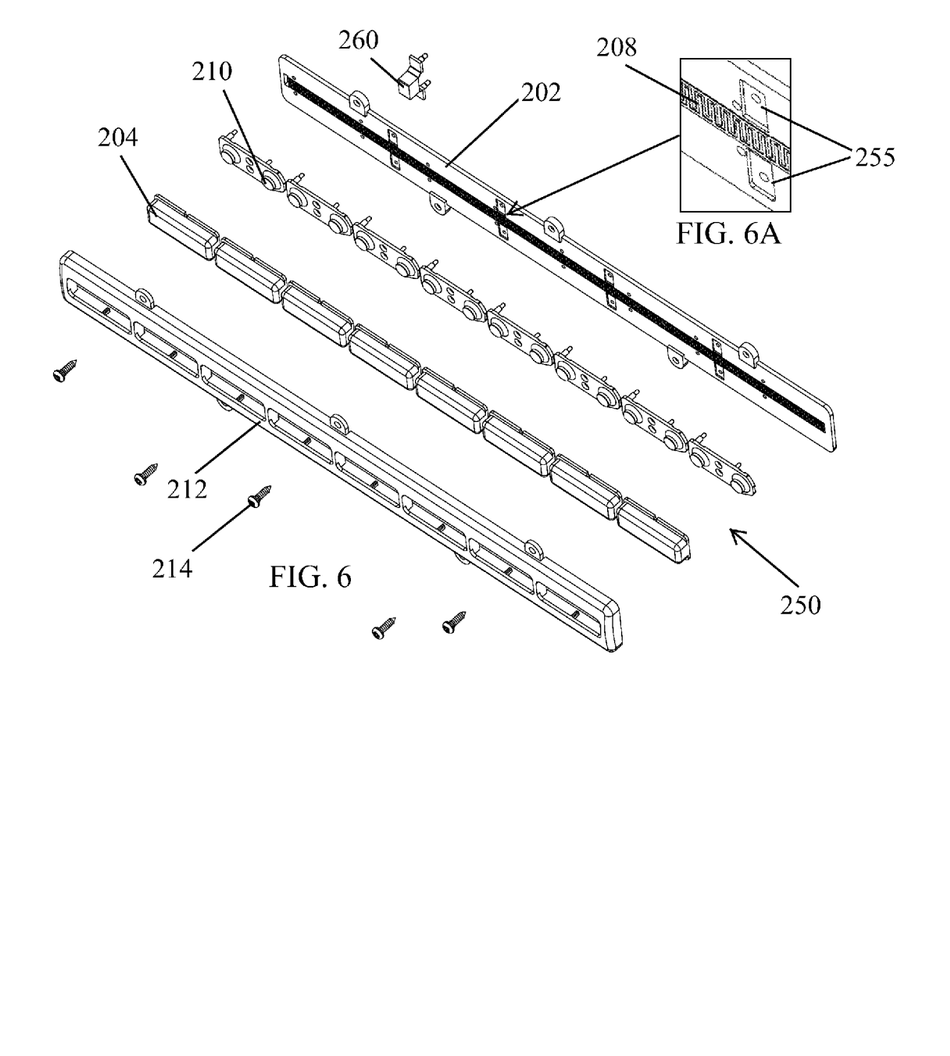
FIG. 6 illustrates another preferred embodiment of the present invention.
FIG. 6A is an enlarged diagram showing sections of FIG. 6.

FIG. 6 illustrates another preferred embodiment of the present invention, while FIG. 6A is an enlarged diagram showing sections of FIG. 6. As shown, bumper structure 250 is very similar to bumper structure 200 shown in FIG. 3 to FIG. 5, the differences are that bumper structure 250 further comprises a plurality of supplement actuator sections 260 formed between actuator sections 210, and corresponding supple conductive terminals (not shown) are formed under supplement actuator sections 260, wherein said supplement actuator sections 260 are also parallel to conductive sheets 208, and supplement conductive terminals are not in contact with conductive sheets 208, also. In addition, bumper structure 250 further comprises a plurality of corresponding hollow sections 255 formed over base 202, for fixing supplement actuator sections 260 on base 202. As such, impacts from any angle will either press actuator sections 210 or supplement actuator sections 260, thus lack of reactions from bumper structure 250 when impact happens are prevented. Moreover, as shown in FIG. 6A, the conductive sheets 208 of bumper structure 250 are formed interdigitally over base 202, this effectively increases the area of conductive sheets, thereby ensures any slight impact will force conductive terminals 206 or supplement conductive terminals to connect conductive sheets 208.

Figure 7:
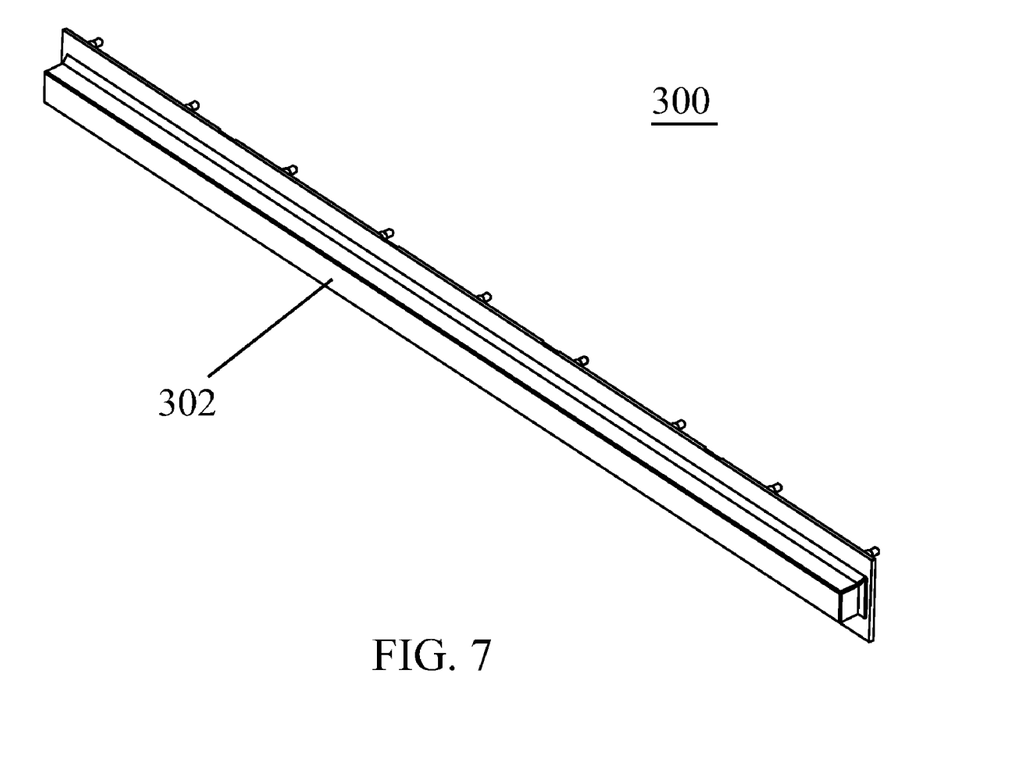
FIG. 7 illustrates another preferred embodiment of the present invention.
Figure 8:
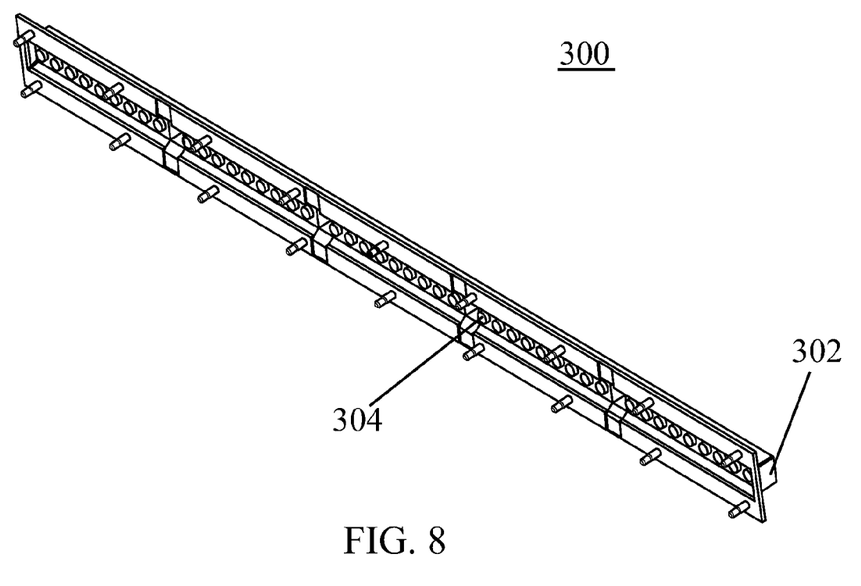
FIG. 8 illustrates the embodiment of FIG. 6 from another angle.

In some embodiments, combinations of the elastic housing, actuator section and conductive terminals may be implemented by an all-in-one conductive rubber particle. Moreover, conductive strips may be formed via connecting a plurality of conductive rubber particles in series for implementation. FIG. 7 and FIG. 8 are an embodiment of the conductive rubber strip disclosed by the present invention. As shown, conductive rubber strip 300 is formed with all-in-one insulating rubber strip 302 and conductive rubber sheets 304 located within insulating rubber strip 302. By connecting conductive rubber strip 300 to the control circuit of a moving device, in coordination with the above mentioned base and conductive sheets, it would be possible to provide buffer and directs the moving device to change directions when impact occurs. As the principles are the same as the previous embodiments, the details are not described.

Figure 9:
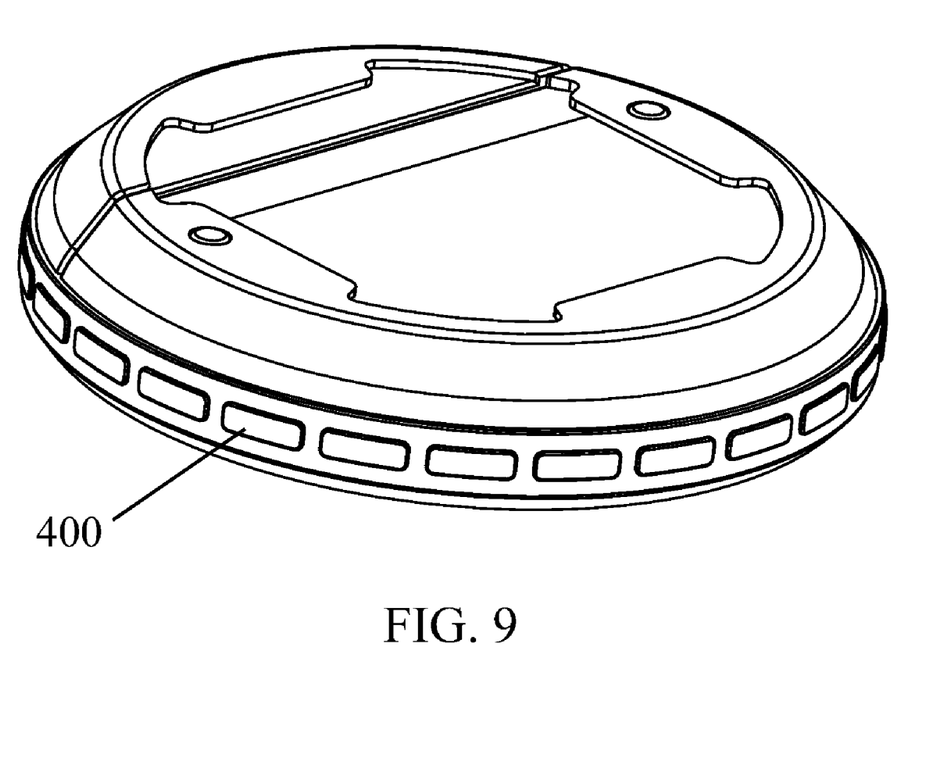
FIG. 9 illustrates a diagram for the application of a bumper structure on a moving device according to the present invention.
Figure 10:
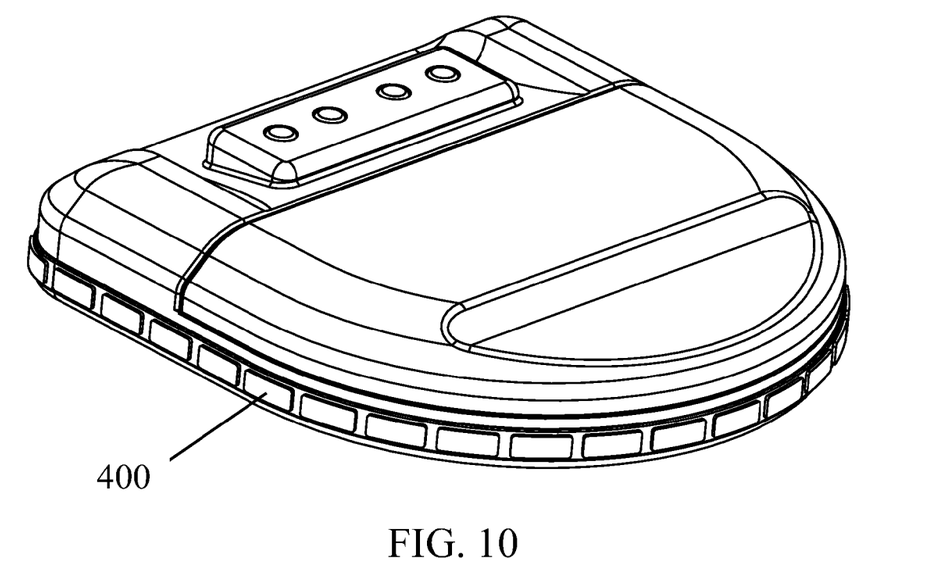
FIG. 10 illustrates a diagram for the application of a bumper structure on another moving device according to the present invention.
Figure 11:
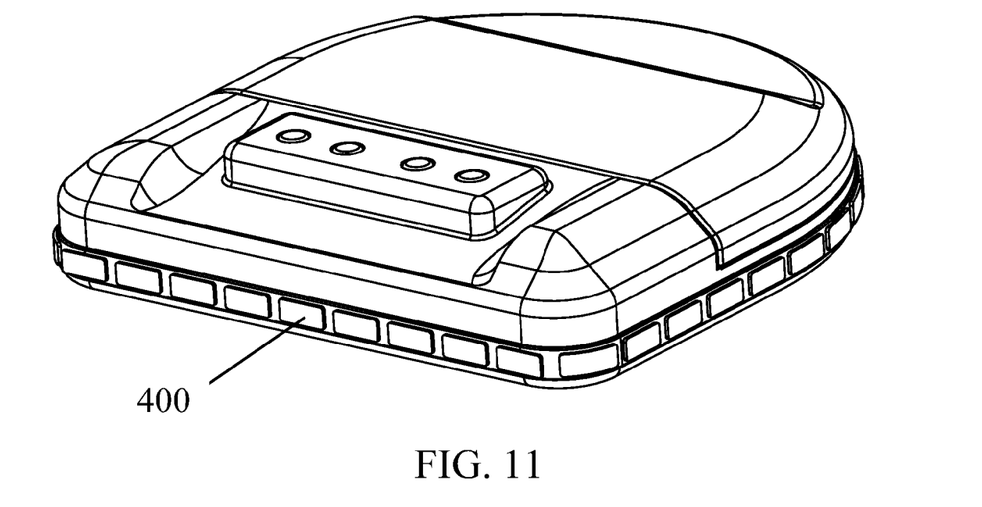
FIG. 11 illustrates the embodiment of FIG. 10 from another angle.

FIG. 9 illustrates a bumper structure (disclosed by the present invention) being applied to a moving device; and FIG. 10 and FIG. 11 illustrate a bumper structure of the present invention being applied to another moving device. As bumper structure 400 of the present invention may be implemented by utilizing elastic materials (such as silicone rubber or rubber etc.), the flexibility of these materials enables bumper structure 400 to surround the outer periphery of the moving device (as shown), which in turn, provides buffer for impacts at any direction (360°) and directs the moving device to change its direction. It should be noted that the bumper structures shown in the diagrams are only preferred embodiments, bumper structures disclosed by the present invention may be installed on other moving devices with different configurations.

The foregoing descriptions are preferred embodiments of the present invention. As is understood by a person skilled in the art, the aforementioned preferred embodiments of the present invention are illustrative of the present invention rather than limiting the present invention. The present invention is intended to cover various modifications and similar arrangements included within the spirit and scope of the appended claims, the scope of which should be accorded the broadest interpretation so as to encompass all such modifications and similar structures.

What is claimed is:

1. A bumper structure for an automatic moving device, which allows said automatic moving device to change directions when bumping into obstacles, comprising:

a base with a plurality of conductive sheets formed over said base, wherein said plurality of conductive sheets are coupled to a control circuit of said automatic moving device;

an elastic housing formed over said base, with a protruding actuator section formed within said elastic housing, and said actuator section being parallel to said plurality of conductive sheets; and a conductive terminal formed at bottom of said actuator section, said conductive terminal being not in contact with said plurality of conductive sheets;

wherein said elastic housing may provide buffer during impact, and force generated by said impact presses said actuator section downwards, allowing said conductive terminal of said actuator section to couple with said plurality of conductive sheets, thereby connecting said plurality of conductive sheets and transmits signal to said control circuit of said automatic moving device for executing a turning command.

2. The bumper structure of claim 1, wherein said base is a flexible base.

3. The bumper structure of claim 2, wherein material of said flexible base is silicone rubber or rubber.

4. The bumper structure of claim 1, wherein said plurality of conductive sheets may be replaced by conductive pads or printed circuits.

5. The bumper structure of claim 1, wherein said elastic housing may be strip-like, granular, columnar, sheet-like, polygonal or irregular shaped.

6. The bumper structure of claim 1, wherein said conductive terminal is conductive rubber, copper or carbon diaphragm.

7. The bumper structure of claim 1, wherein combination of said elastic housing, said actuator section and said conductive terminal may be an all-in-one conductive rubber particle.

8. The bumper structure of claim 7, wherein said conductive rubber particle may be connected with each other to form a conductive rubber strip.

9. The bumper structure of claim 1, wherein said automatic moving device includes robots, small vehicles or toys.

10. A bumper structure for an automatic moving device, which allows said automatic moving device to change directions when bumping into obstacles, comprising:

a base with a plurality of conductive sheets formed over said base, wherein said plurality of conductive sheets are coupled to a control circuit of said automatic moving device;

a plurality of actuator sections, formed over said base, with a plurality of corresponding conductive terminals formed at bottom of said plurality of actuator sections, wherein said plurality of actuator sections being parallel to said plurality of conductive sheets, and said plurality of conductive terminals being not in contact with said plurality of conductive sheets; and a plurality of elastic housings, formed over said plurality of actuator sections;

wherein said elastic housing may provide buffer during impact, and force generated by said impact presses corresponding said actuator section downwards, allowing said conductive terminal of said corresponding actuator section to couple with said plurality of conductive sheets, thereby connecting said plurality of conductive sheets and transmits signal to said control circuit of said automatic moving device for executing a turning command.

11. The bumper structure of claim 10, further comprising a plurality of supplement actuator sections formed between said plurality of actuator sections, with a plurality of corresponding supplement conductive terminals formed at bottom of said plurality of supplement actuator sections, wherein said plurality of supplement actuator sections being parallel to said plurality of conductive sheets, and said plurality of supplement conductive terminals being not in contact with said plurality of conductive sheets.

12. The bumper structure of claim 11, wherein said plurality of supplement actuator sections are fixed on said base through a plurality of corresponding hollow sections formed over said base.

13. The bumper structure of claim 11, wherein said plurality of supplement conductive terminals is conductive rubber, copper or carbon diaphragm.

14. The bumper structure of claim 10, wherein said plurality of conductive sheets is formed interdigitally over said base.

15. The bumper structure of claim 10, wherein said base is a flexible base.

16. The bumper structure of claim 10, wherein said plurality of conductive sheets may be replaced by conductive pads or printed circuits.

17. The bumper structure of claim 10, wherein said plurality of elastic housings may be strip-like, granular, columnar, sheet-like, polygonal or irregular shaped.

18. The bumper structure of claim 10, wherein said plurality of conductive terminals is conductive rubber, copper or carbon diaphragm.

19. The bumper structure of claim 10, wherein combination of said plurality of elastic housings, said plurality of actuator sections and said plurality of conductive terminals may be an all-in-one conductive rubber strip.

20. An automatic moving device with a bumper structure, allowing said automatic moving device to change directions when bumping into obstacles, comprising:
- an automatic moving device body, including a control circuit;
- a bumper structure surrounding outer periphery of said automatic moving device body, including:
  - a base with a plurality of conductive sheets formed over said base, wherein said plurality of conductive sheets are coupled to said control circuit of said automatic moving device body;
  - a plurality of elastic housings, formed over said base, with a plurality of protruding actuator sections formed within said elastic housing, and said plurality of actuator sections being parallel to said plurality of conductive sheets; and
  - a plurality of conductive terminals, formed at bottom of said plurality of actuator sections, said conductive terminal being not in contact with said plurality of conductive sheets;
  - wherein said elastic housing may provide buffer during impact, and force generated by said impact presses said actuator section downwards, allowing said conductive terminal of said actuator section to couple with said plurality of conductive sheets, thereby connecting said plurality of conductive sheets and transmits signal to said control circuit of said automatic moving device body for executing a turning command.

* * * * *